(12) United States Patent
Lewis (10) Patent No.: US 9,842,214 B2
(45) Date of Patent: Dec. 12, 2017

(54) SYSTEM AND METHOD TO SECURE ON-BOARD BUS TRANSACTIONS

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/482,701

(22) Filed: Sep. 10, 2014

(65) Prior Publication Data

US 2015/0074427 A1    Mar. 12, 2015

Related U.S. Application Data

(60) Provisional application No. 61/875,812, filed on Sep. 10, 2013.

(51) Int. Cl.
| | |
|---|---|
| *G06F 21/00* | (2013.01) |
| *G06F 21/60* | (2013.01) |
| *H04L 9/08* | (2006.01) |
| *G06F 21/82* | (2013.01) |

(52) U.S. Cl.
CPC ............ *G06F 21/602* (2013.01); *G06F 21/82* (2013.01); *H04L 9/0816* (2013.01); *H04L 9/0861* (2013.01); *H04L 9/0894* (2013.01); *H04L 2209/12* (2013.01)

(58) Field of Classification Search
CPC ....... H04L 9/08; H04L 9/0816; H04L 9/0861; H04L 9/14
See application file for complete search history.

(56) References Cited

U.S. PATENT DOCUMENTS

| | | | |
|---|---|---|---|
| 2007/0143606 A1* | 6/2007 | Bandholz ................ | G06F 21/85 713/168 |
| 2009/0323932 A1* | 12/2009 | Youn ....................... | H04L 9/002 380/30 |
| 2011/0138192 A1* | 6/2011 | Kocher .................. | G06F 21/602 713/189 |

* cited by examiner

*Primary Examiner* — Edward Zee
(74) *Attorney, Agent, or Firm* — McCarter & English, LLP; John S. Curran (57) ABSTRACT

A technique for securing on-board bus transactions in a computing device is discussed. A shared key is generated and then programmed into the read-only non-volatile write-once storage of two on-board components. The shared key may be generated during the manufacturing process. Once complete, all transactions between the two on-board components are encrypted by the components using the shared key without exposing the key on any external bus.

21 Claims, 5 Drawing Sheets

SYSTEM AND METHOD TO SECURE ON-BOARD BUS TRANSACTIONS

RELATED APPLICATION

This application is related to, and claims the benefit of, U.S. Provisional Patent Application No. 61/875,812, entitled "System and Method to Secure On-Board Bus Transactions", filed Sep. 10, 2013, the contents of which are incorporated herein by reference in their entirety.

BACKGROUND

It can be difficult to secure a computing system against unauthorized access when the attacker has physical access to the system. The reason for this difficulty is that physical access to the computing system allows the attacker to probe the electrical traces used to transmit information between components on the motherboard. Since the transmission protocols used to encode the data transmitted across these traces is generally available (because they are usually a standard), an attacker with physical access to the system can watch for sensitive information or even inject data. For example, by finding the decryption key, the attacker can read data via the electrical signals which is otherwise unavailable to software running on that system (because of various software protections). Alternatively, by injecting data at a specific point, a denial of privilege can be converted into a granting of privilege.

BRIEF SUMMARY

Embodiments of the present invention provide a technique for securing on-board bus transactions. In one embodiment, during the manufacturing process, a shared key is generated and then programmed into write-once, read-only non-volatile storage of two on-board components. Once the shared key has been generated and written to storage, all transactions between the two components are encrypted by the components using the shared key without exposing the key on any external bus.

In one embodiment, a computing device-implemented method for securing on-board bus transactions includes retrieving a shared key from a write-once non-volatile storage of a first on-board component of a computing device. Data is then encrypted at the first on-board component using the retrieved key and the encrypted data is transmitted across a bus in the computing device to a second on-board component of the computing device. The method also retrieves a shared key from a write-once non-volatile storage of the second on-board component and decrypts the encrypted data using the shared key retrieved from the write-once non-volatile storage of the second on-board component. The first on-board component and the second on-board component each include a crypto-engine capable of performing encryption and decryption operations.

In another embodiment, a computing system providing secure on-board bus transactions includes a peripheral controller. The peripheral controller includes a write-once non-volatile storage that holds a shared key. The peripheral controller also includes a peripheral bus host controller that includes a crypto-engine capable of performing encryption and decryption operations encrypting or decrypting data using the shared key held in the write-once non-volatile storage of the peripheral controller. The computing system further includes a peripheral bus and a peripheral in communication over the peripheral bus with the peripheral controller. The peripheral includes a write-once non-volatile storage that holds the shared key. The peripheral also includes a crypto-engine capable of performing encryption and decryption operations encrypting or decrypting data using the shared key held in the write-once non-volatile storage of the peripheral.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention use a shared key stored in write-once, non-volatile key storage to perform cryptographic processing inside components communicating over a system's motherboard so as to ensure that no unencrypted data or code is exposed outside of the components. This configuration prevents interception by probing of electrical signals by unauthorized individuals that have gained physical access to the computing system. By making the installation of the key into the write-once key storage of each component a write-once operation, the installation can be done during the manufacturing of the device which is in most circumstances a controlled and secure environment. Further, by making the write-once key storage writable, each unit of a particular product may have a uniquely generated key. As a result of this uniqueness, if somehow the key from one device is compromised, it does not necessarily jeopardize the security of other devices.

Figure 1:
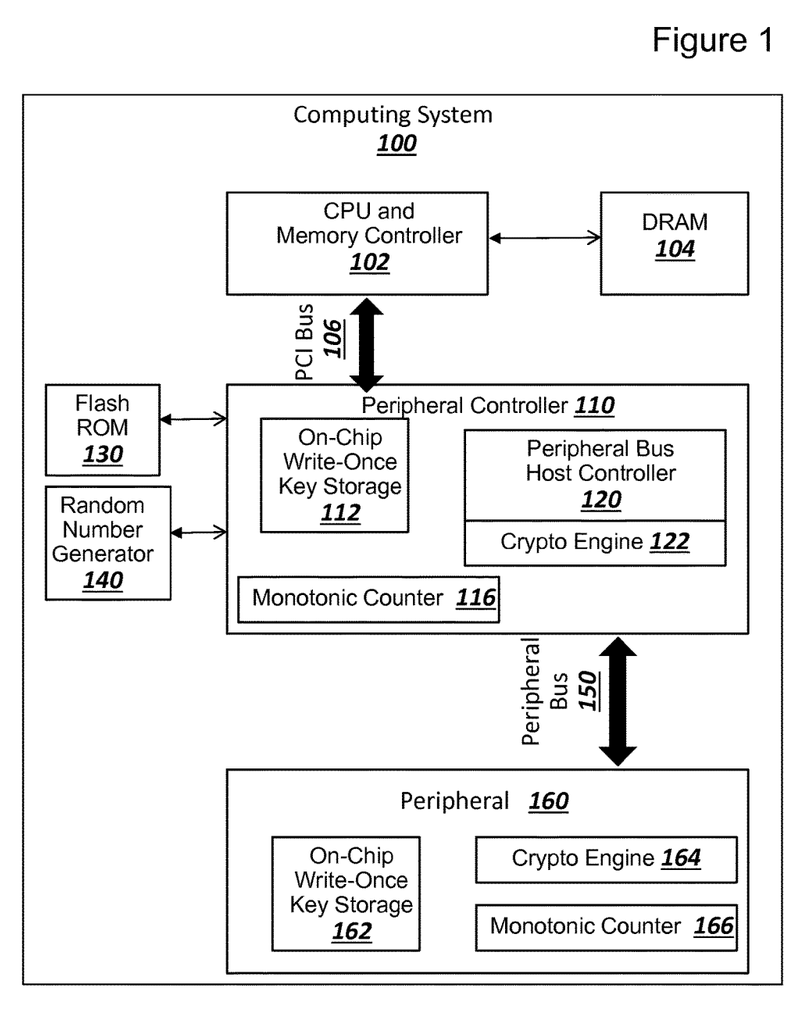
FIG. 1 depicts an exemplary computing system containing hardware components utilized by embodiments of the present invention.

FIG. 1 depicts an exemplary computing system containing hardware components utilized by embodiments of the present invention. Computer system 100 includes a CPU and memory controller 102 which fetches CPU instructions from dynamic random access memory (DRAM) 104 or flash read only memory (ROM) 130. It will be appreciated that other forms of RAM or ROM may be employed by computing system 100 without departing from the scope of the present invention. CPU 102 communicates with the flash ROM 130 and peripherals via a PCI bus 106 and peripheral controller 110. Peripheral controller 110 translates CPU I/O and memory reads and writes into cycles appropriate for flash ROM 130 using a flash host controller (not shown) or peripheral 160 via a peripheral bus host controller 120 and peripheral bus 150. Examples of a peripheral controller suitable for use with an embodiment of the present invention include INTEL's ICH and PCH chips. Examples of a peripheral bus host controller suitable for use with an embodiment of the present invention include the USB OCHI, UHCI or XHCI host controller which sends and receives data over peripheral bus 150 to peripheral 160. Examples of a peripheral suitable for use with an embodiment of the present invention include a USB keyboard, USB mass storage device, PCI peripheral, a touch panel, PS/2 style keyboard or display controller although it will be appreciated that many other types of peripherals are also within the scope of the present invention. It will be further appreciated that the exact bus configuration or the way in which functions are divided between the CPU, memory controller and peripheral controller can be rearranged without departing from the scope of the present invention.

In one embodiment, both the peripheral bus host controller 120 and the peripheral 160 contain a crypto-engine 122, 164 and a quantity of non-volatile, write-once key storage 112, 162. The write-once storage may be on-chip EEPROM, but could take other form. Other examples of write-once storage include forms of battery-backed SRAM, fuses or CPLDs. The crypto-engine 122, 164 is capable of performing encryption and decryption operations using shared keys stored in the write-once key storage 112, 162 without exposing any of the processing or key data to any external chip signals including DRAM, debug signals. In one embodiment, symmetric algorithms (and symmetric keys) are used for encryption and decryption due to being faster and requiring a smaller key size, although it will be appreciated that other types of non-symmetric keys and non-symmetric algorithms are also considered to be within the scope of the present invention.

In an alternate embodiment, asymmetric algorithms may be employed using public-private key pairs. In one embodiment, a first component uses the public half of a public-private key pair and the second component that is communicating with the first component uses the private half of the public-private key pair Alternatively, two separate public-private key pairs may be shared. The first on-board component may hold a first private key and a first public key and the write-once non-volatile storage of a second on-board component may hold a corresponding second public key associated with the first private key and a second private key associated with the first public key (as used herein the term "on-board" refers to a motherboard of the computing system).

In an embodiment, the write-once key storage 112, 162 for both devices is not readable on any external data signals. As an additional aspect of the present invention, the write-once key storage 112, 162 is writable exactly once from a program executed by the CPU 102. After being written, the write-once key storage 112, 162 can no longer be updated. Once the write-once key storage 112, 162 is written, its status as having been written is detectable without actually reading the contents of the write-once key storage. For example, a detection of write-once key storage status may be done by keeping a separate read-only status flag or by attempting to perform a subsequent write to the write-once storage (which would fail and be interpreted as an indicator that the storage was already written). A hardware random number generator 140 utilized by embodiments of the present invention provides a unique random number that meets normal criteria for randomness and period.

In another embodiment, the key storage may be made non-volatile using a separate step. This allows for a case when the key fails to be written to the peripheral's key storage, allowing for repair. Once the key is written successfully to the peripheral's key storage, the key is written to the peripheral controller's key storage and the write-once lock is set. Once locked, the key storage cannot be unlocked.

Figure 2:
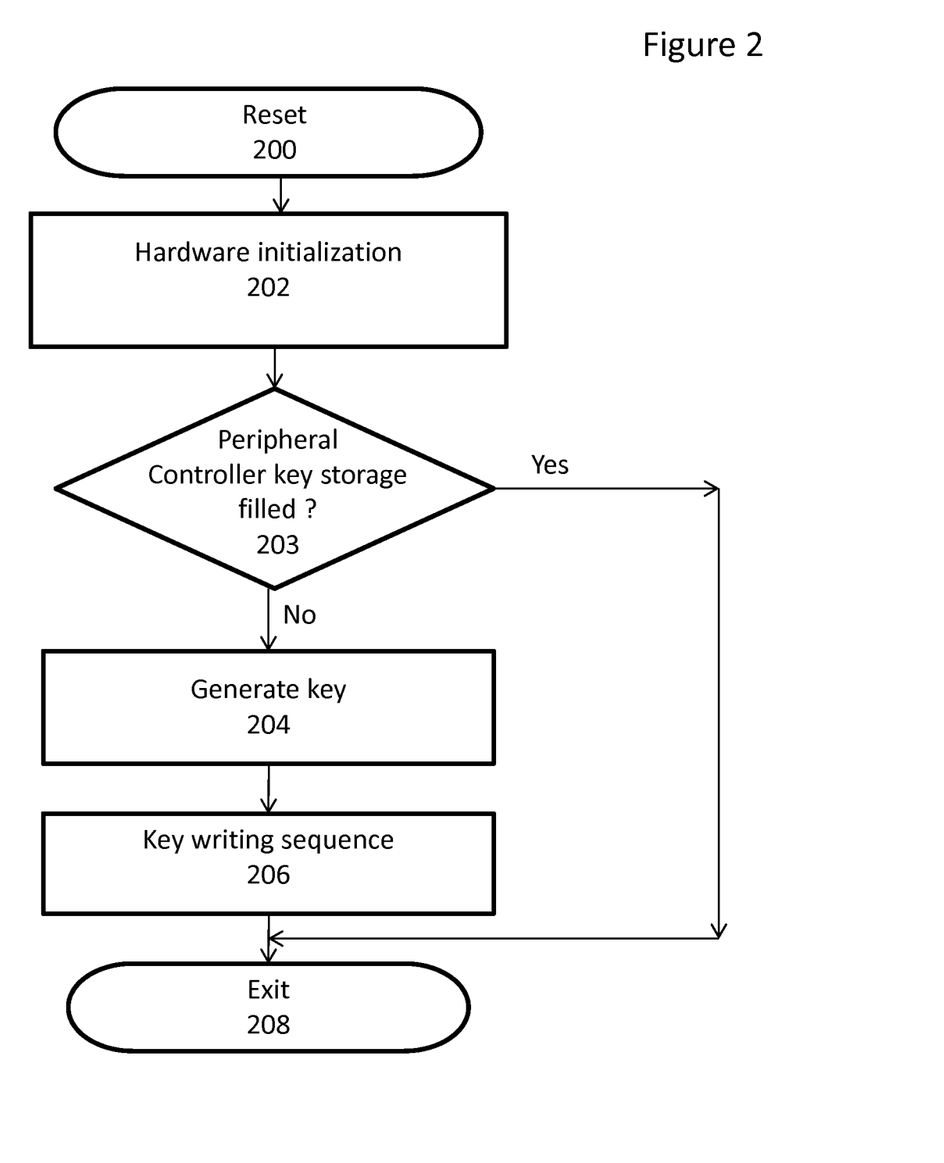
FIG. 2 depicts an exemplary sequence of steps performed by an embodiment of the present invention to generate and write a shared key.

FIG. 2 depicts an exemplary sequence of steps performed by an embodiment of the present invention to generate and write a shared key. More particularly the sequence describes how the write-once key storage 112 of the peripheral controller 110 and the write-once key storage 162 of the peripheral 160 may be filled with the shared key on the first boot of the system. The sequence begins after reset (step 200) when the computer system begins execution of code stored within the platform firmware in order to perform hardware initialization (step 202). Once the system is able to communicate with the peripheral controller 110, a check is performed (step 203) to detect whether the peripheral controller write-once key storage 112 is full. If the write-once key storage 112 is full, then the next steps of generating and writing a shared key are not required and the sequence exits (step 208). In one embodiment, the check of only the write-once key storage 112 of the peripheral controller 110 is adequate since the peripheral controller's write-once key storage will only be populated after the peripheral's write-once key storage 162. In other embodiments, both write-once key storages may be checked.

If the peripheral controller key write-once key storage is not full (step 203), then once the system is able to communicate with the peripheral controller 110, peripheral 160, and the crypto-engines 122, 164 and write-once key storage 112, 162 of both the peripheral and peripheral controller, the shared key(s) are generated (step 204). In a preferred embodiment, the PBKDF2 algorithm described in RFC 2898 (and PKCS #5, version 2.0) is used, using a random number generated from the hardware random number generator as the password and the platforms UUID as the salt. A salt is random data used as additional input to a one-way hash function. Other algorithms, passwords and salts can be used, including those read from an external storage device or which use a software random number algorithm with a seed derived from a suitable random source. The generated shared key is fitted to the size required by the cryptographic algorithm(s) supported by the crypto-engines.

Figure 3:
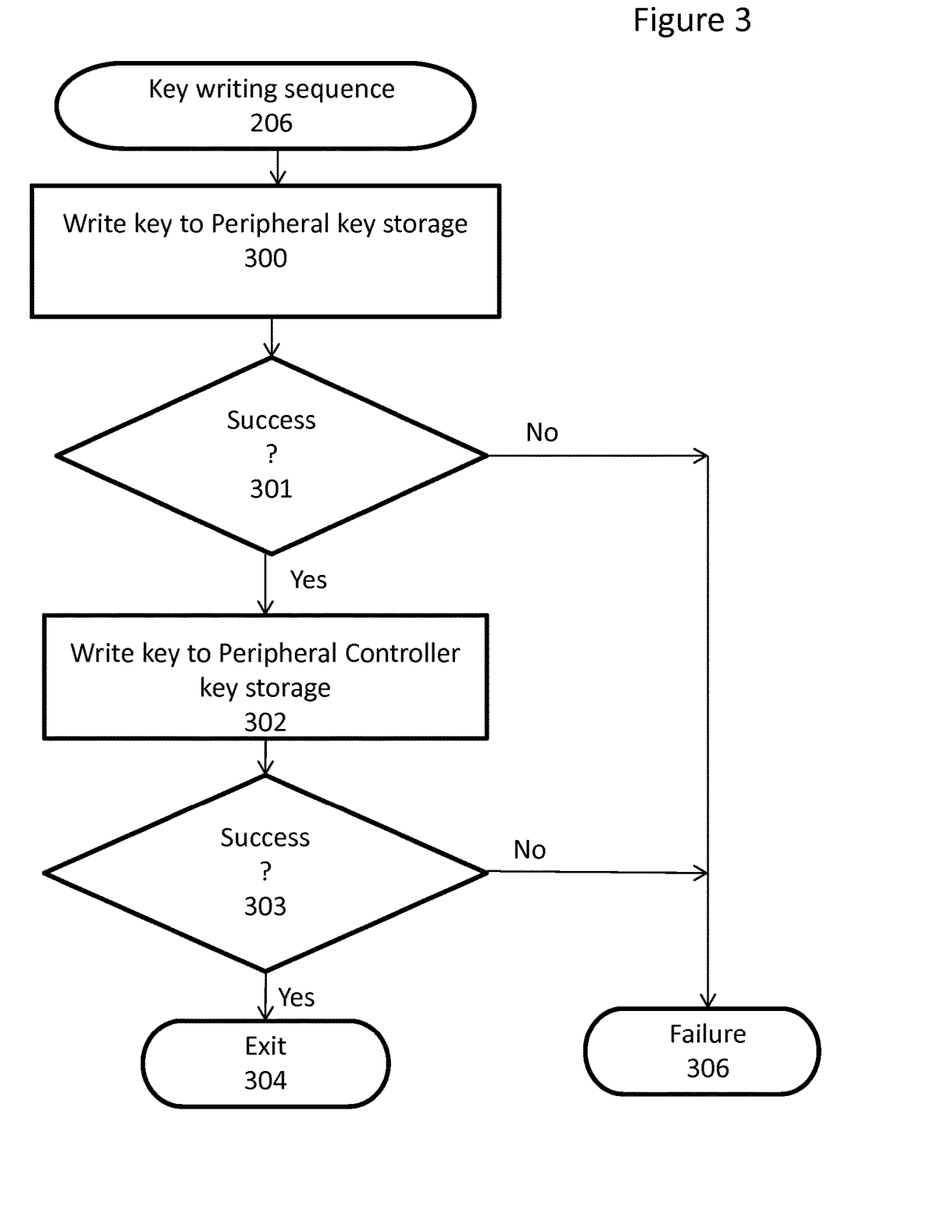
FIG. 3 depicts an exemplary key writing sequence of FIG. 2 in greater detail.

After the key is generated, it must be programmed into the peripheral's and peripheral controller's write-once key storage 112 and 162. The exact method of programming the key into the peripheral's write-once key storage is not specific to this invention, as many methods are well-known, and may involve commands specific to the type of peripheral bus and possibly peripheral. Notwithstanding the above, FIG. 3 depicts an exemplary key writing sequence of FIG. 2 in greater detail. The sequence begins by attempting to write the shared key to peripheral key storage (step 300). If the key is not written successfully (step 301), this may be a recoverable error. In the case of a fatal error (step 306), the system may report an error to the user, reset the system, log the condition and continue or halt or other behaviors. If the key is written successfully to the write-once storage 162 of the peripheral (step 301), then an attempt is made to write the shared key to the peripheral controller's write-once key storage 112 (step 302). If the shared key is not successfully written to write-once key storage 112 (step 303), then this is a fatal error (step 306) since the shared key was generated and already written to the write-once storage 162 of the peripheral 160. As noted above, the system may take a number of different actions following the failure including reporting the error and resetting the system. If the write of the shared key to the write-once storage 112 of the peripheral controller 110 is successful (step 303), the key writing procedure is successful and exits (step 304) and system execution continues normally.

Figure 4:
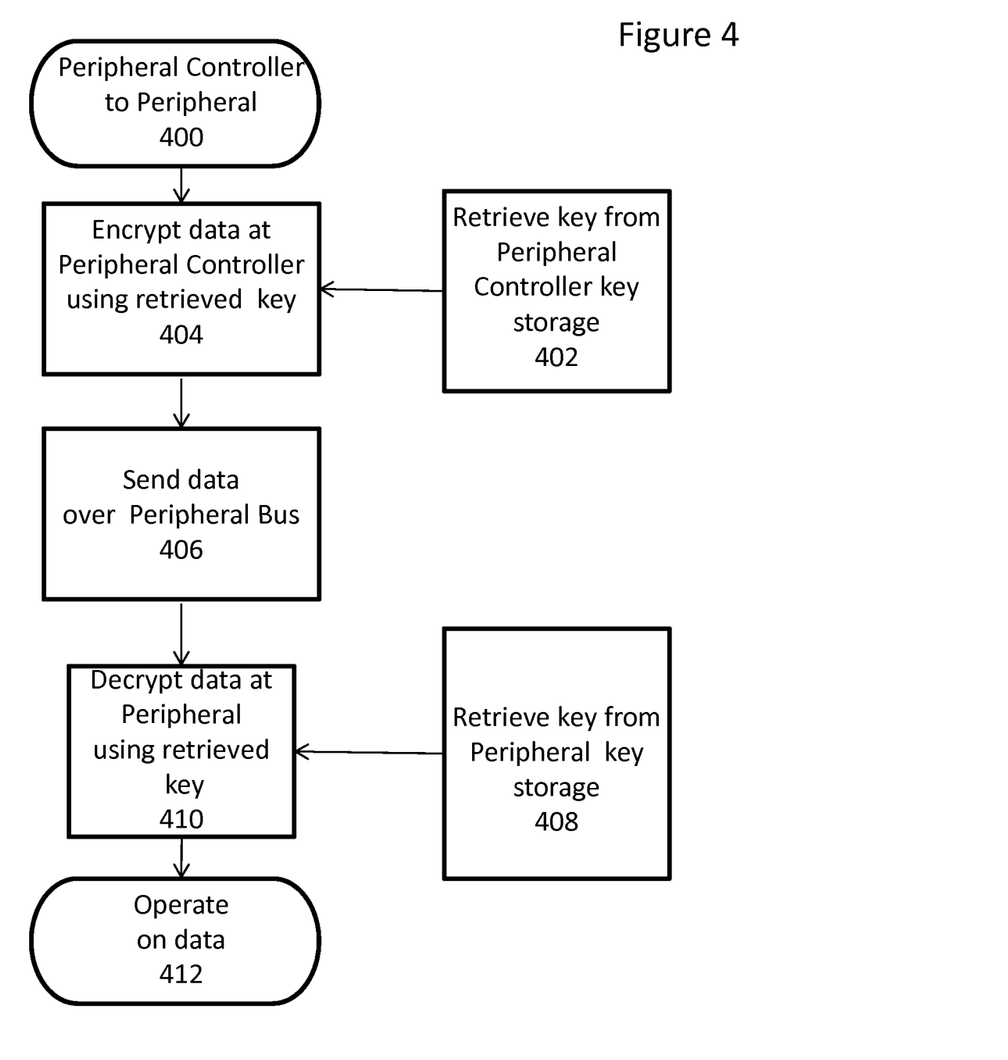
FIG. 4 depicts an exemplary sequence of steps performed by an embodiment of the present invention to conduct secure transactions using a shared key to transmit encrypted data from a peripheral controller to a peripheral.

FIG. 4 depicts an exemplary sequence of steps performed by an embodiment of the present invention to conduct secure transactions using a shared key to transmit encrypted data from a peripheral controller to a peripheral. When the peripheral controller prepares to send data to the peripheral (step 400), it first retrieves the shared key from its write-once storage 112 (step 402) and its crypto-engine 122 uses the retrieved key to encrypt the data portion of the transaction (step 404). In general, the encryption does not operate on the control or encapsulation portions of the peripheral bus transactions, only the data contents. Following encryption, the encrypted data is sent from the peripheral controller 110 across the peripheral bus 150 where it is received by the peripheral 160 (step 406). The peripheral 160 then proceeds to retrieve the shared key from its once-write storage 162 (step 408) and its crypto-engine 164 uses the shared key to decrypt the data (step 410) using the crypto logic and the key stored in the peripheral write-once key storage. Once the data is decrypted, it may be used normally (step 412). In this way, the unencrypted data is never exposed on the peripheral bus.

Figure 5:
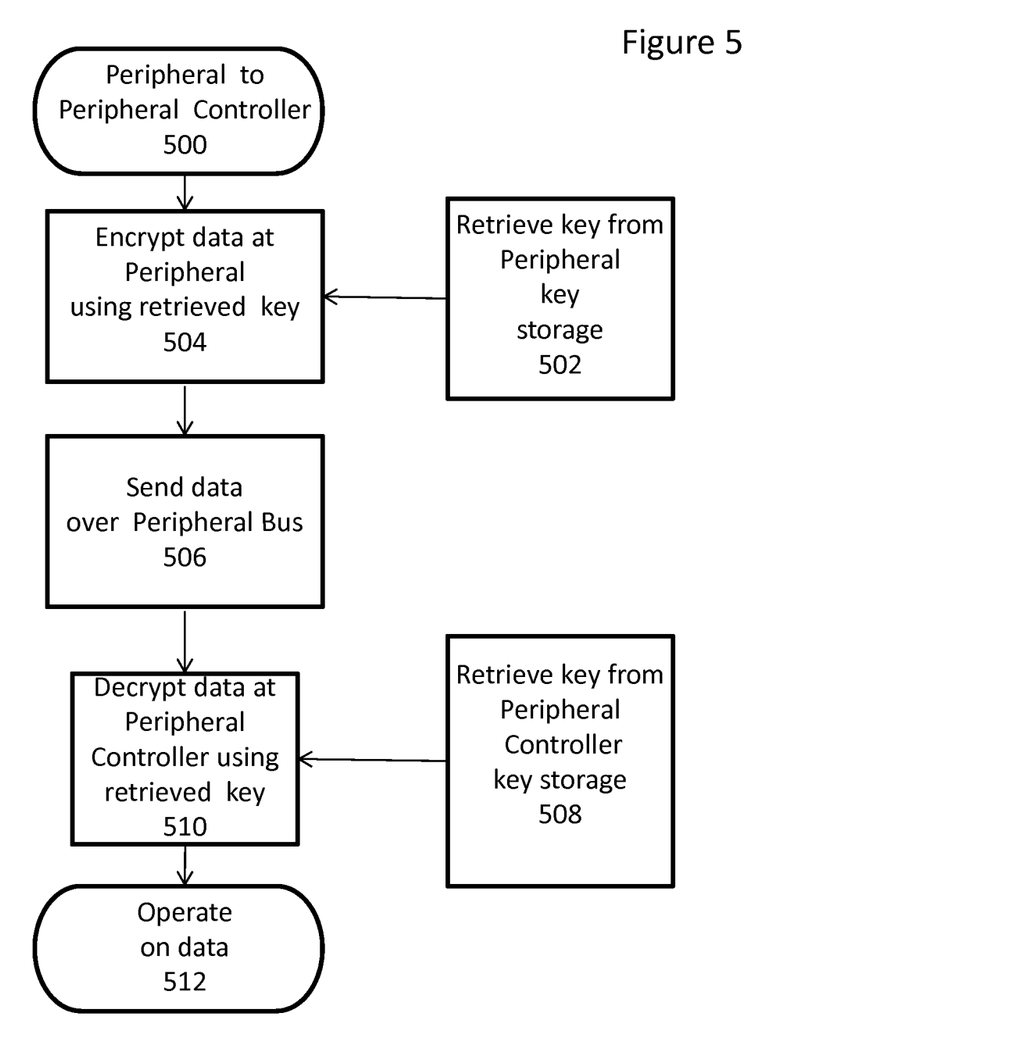
FIG. 5 depicts an exemplary sequence of steps performed by an embodiment of the present invention to conduct secure transactions using a shared key to transmit encrypted data from a peripheral to a peripheral controller.

It will be appreciated that transactions originating at the peripheral may be similarly secured. For example, FIG. 5 depicts an exemplary sequence of steps performed by an embodiment of the present invention to conduct secure transactions using a shared key to transmit encrypted data from a peripheral to a peripheral controller. When the peripheral 160 prepares to send data to the peripheral controller 110 (step 500), it first retrieves the shared key from write-once storage 162 (step 502) and encrypts the data portion of the transaction (step 504) using the crypto-logic and the retrieved key. In general, the encryption does not operate on the control or encapsulation portions of the peripheral bus transactions, only the data contents. Then the encrypted data is sent normally across the peripheral bus (step 506), where it is received by the peripheral controller 110. The peripheral controller 110 then proceeds to retrieve the shared key from its write-once storage (step 508) and decrypt the data (step 510) using the crypto logic and the retrieved shared key. Once the data is decrypted, it may be used normally (step 512). In this way, the actual unencrypted data is never exposed on the peripheral bus 150. If the shared keys are not programmed into write-once key storage, no encryption or decryption is done.

In the case when data transactions are too small to hold the entire encrypted form of the data, additional data transactions may be necessary to complete the transmission of all the data. For example, a USB key press might only require two bytes while the minimum encryption size for a symmetric encryption algorithm might be 128 bits (8 bytes). Since the size of transmission across the USB bus may be fixed as 2 bytes, an alternate command may be necessary or 3 more 2-byte "dummy" transactions may be performed. These so-called dummy transactions would contain the additional 6 bytes of encrypted data. In another example, on the PCI device some transactions are sent using a single 32-bit transaction so an additional transaction would be necessary between the PCI host controller and the PCI device to obtain the additional 32-bits.

In one embodiment, to enhance the security of data transactions, additional security steps may be taken. To prevent replay injection attacks, each communicating component may maintain a monotonic counter 116, 166 whose value is encrypted with the data. The receiving side checks the decoded data to verify that the decrypted monotonic counter value matches the expected value. After each successful transaction, the counter is incremented. In another embodiment, to prevent dictionary attacks, small data transactions may be salted with random values. For example, all possible key values from a peripheral keyboard would normally only translate to a few different encrypted values, since the key is static and the encryption algorithm produces the same encrypted value each time. It is possible therefore to relatively quickly construct a dictionary for a single device by pressing keys and then watching the resulting relatively small set of encrypted keys. However, by having the sender add a random number into the encrypted data as described above, no reliable pattern may be discovered by unauthorized individuals. After decryption, the random number portion of the data is simply ignored.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for securing on-board bus transactions:

retrieving a shared key from a write-once non-volatile storage of a peripheral controller of the computing device;

encrypting data at the peripheral controller using the retrieved key;

transmitting the encrypted data across a bus in the computing device to a target peripheral of the computing device;

retrieving a shared key from a write-once non-volatile storage of the target peripheral; and decrypting the encrypted data using the shared key retrieved from the write-once non-volatile storage of the target peripheral, the decrypting occurring at the target peripheral, wherein the peripheral controller and the target peripheral each include a crypto-engine configured to perform encryption and decryption operations.

2. The method of claim 1 wherein the shared key is generated and stored during the manufacturing process for the computing device.

3. The method of claim 1, further comprising:
increasing a size of the data to be encrypted so as to be consistent with a size required for an encryption algorithm performed by the crypto-engine on the peripheral controller, the increasing performed prior to encrypting the data with the retrieved key; and
transmitting the encrypted data in multiple transactions to the target peripheral.

4. The method of claim 1 further comprising:
maintaining a first monotonic counter having a value at the peripheral controller;
maintaining a second monotonic counter having a value at the target peripheral, the values of the first and second monotonic counters being the same;
encrypting the value of the first monotonic counter with the data before transmitting the encrypted data;
decrypting the encrypted value at the target peripheral;
comparing the decrypted value with the value of the second monotonic counter; and
incrementing the respective values of the first and second monotonic counters following a match, the incremented values of the first and second monotonic counter being the same.

5. The method of claim 1, further comprising:
salting the data with random number values prior to encrypting.

6. The method of claim 1 wherein the shared key is a symmetrical key.

7. The method of claim 1 wherein the shared key is an asymmetrical key.

8. The method of claim 1 wherein the shared key is a public-private key.

9. The method of claim 1 wherein the shared key is a pair of shared keys and where the write-once non-volatile storage of the peripheral controller holds a first private key and a first public key and the write-once non-volatile storage of the target peripheral holds a corresponding second public key associated with the first private key and a second private key associated with the first public key.

10. A computing system providing secure on-board bus transactions, comprising:
a peripheral controller, the peripheral controller including:
  a write-once non-volatile storage, the write-once non-volatile storage holding a shared key, and
  a peripheral bus host controller that includes a crypto-engine configured to perform encryption and decryption operations encrypting or decrypting data using the shared key held in the write-once non-volatile storage of the peripheral controller;
a peripheral bus; and
a target peripheral, the target peripheral in communication over the peripheral bus with the peripheral controller, the target peripheral including:
  a write-once non-volatile storage, the write-once non-volatile storage holding the shared key, and
  a crypto-engine configured to perform:
    decryption operations decrypting data received over the peripheral bus sent from the peripheral controller to the target peripheral using the shared key held in the write-once non-volatile storage of the target peripheral, and
    encryption operations encrypting data for transmittal over the peripheral bus to the peripheral controller using the shared key held in the write-once non-volatile storage of the target peripheral.

11. The computing system of claim 10, wherein the peripheral controller includes a first monotonic counter having a value and the target peripheral includes a second monotonic counter having a value, the values of the first and second monotonic counter being the same, and wherein the value of the first monotonic counter is encrypted with data before transmitting the encrypted value and data, the encrypted monotonic value decrypted and compared to the value of the second monotonic counter.

12. The computing system of claim 10, wherein the peripheral controller includes a first monotonic counter having a value and the target peripheral includes a second monotonic counter having a value, the values of the first and second monotonic counter being the same, and wherein the value of the second monotonic counter is encrypted with data before transmitting the encrypted value and data, the encrypted monotonic value decrypted and compared to the value of the first monotonic counter.

13. The computing system of claim 10, further comprising:
a random number generator, the random number generator configured to produce a random number used to generate the shared key or to salt the data prior to its encryption by the peripheral controller.

14. A non-transitory medium, holding computer-executable instructions for securing on-board bus transactions on a computing device, the instructions when executed causing the computing device to:
retrieve a shared key from a write-once non-volatile storage of a peripheral controller of the computing device;
encrypt data at the peripheral controller using the retrieved key;
transmit the encrypted data across a bus in the computing device to a target peripheral of the computing device;
retrieve a shared key from a write-once non-volatile storage of the target peripheral; and
decrypt the encrypted data using the shared key retrieved from the write-once non-volatile storage of the target peripheral, the decrypting occurring at the target peripheral;
wherein the peripheral controller and the target peripheral each include a crypto-engine configured to perform encryption and decryption operations.

15. The medium of claim 14 wherein the shared key is generated and stored during the manufacturing process for the computing device.

16. The medium of claim 14 wherein the instructions when executed further cause the computing device to:
maintain a first monotonic counter having a value at the peripheral controller;
maintain a second monotonic counter having a value at the target peripheral, the values of the first and second monotonic counters being the same;
encrypt the value of the first monotonic counter with the data before transmitting the encrypted data;
decrypt the encrypted value at the target peripheral;
compare the decrypted value with the value of the second monotonic counter; and
increment the respective values of the first and second monotonic counters following a match, the incremented values of the first and second monotonic counter being the same.

17. The medium of claim 14 wherein the shared key is a symmetrical key.

18. The medium of claim 14 wherein the shared key is an asymmetrical key.

19. The medium of claim 14 wherein the shared key is a public-private key.

20. The medium of claim 14 wherein the shared key is a pair of shared keys and where the write-once non-volatile storage of the peripheral controller holds a first private key and a first public key and the write-once non-volatile storage of the target peripheral holds a corresponding second public key associated with the first private key and a second private key associated with the first public key.

21. The medium of claim 14 wherein the data is salted with random number values prior to encrypting.

* * * * *